United States Patent [19]

Magrath, Jr. et al.

[11] Patent Number: 5,184,694
[45] Date of Patent: Feb. 9, 1993

[54] REMOTE CONTROL SYSTEM FOR GO KART TRACK AND GO KART CONVERSION KIT

[75] Inventors: Earl K. Magrath, Jr., Chattanooga, Tenn.; Billy K. Foster, Winter Park, Fla.

[73] Assignees: Pacer Manufacturing Co., Inc., Chattanooga, Tenn.; Micro Firm, Inc., Winter Park, Fla.

[21] Appl. No.: 697,246

[22] Filed: May 8, 1991

[51] Int. Cl.⁵ .............................................. B60T 7/16
[52] U.S. Cl. .................... 180/167; 180/168; 180/169; 318/587; 340/435
[58] Field of Search .................... 180/167, 168, 169; 340/901, 435; 318/587

[56] References Cited

U.S. PATENT DOCUMENTS

| | | | |
|---|---|---|---|
| 1,610,692 | 12/1926 | Logwood | 246/63 A |
| 3,007,538 | 11/1961 | Hill | 180/167 |
| 3,038,970 | 6/1962 | Paluka | 180/168 |
| 3,128,840 | 4/1964 | Barrett, Jr. | 180/167 |
| 3,368,639 | 2/1968 | Deane | 180/167 |
| 3,580,353 | 5/1971 | Thompson | 180/167 |
| 3,587,769 | 6/1971 | Lotter | 180/167 |
| 4,619,231 | 10/1986 | Stolar et al. | 123/133 |
| 4,660,528 | 4/1987 | Buck | 180/167 |
| 4,926,161 | 5/1990 | Cupp | 180/167 |
| 5,053,768 | 10/1991 | Dix, Jr. | 180/167 |

Primary Examiner—Eric D. Culbreth
Attorney, Agent, or Firm—Joe M. Muncy

[57] ABSTRACT

A system for controlling at least one go kart in an operation area includes a general transmitter, an area transmitter, a receiver unit on each go kart and an idling device. The operation area includes a track and a pit area. The general transmitter is either a radio transmitter or a loop which encircles the entire operation area. Upon activation of the general transmitter, a signal is emitted such that go karts anywhere in the operation area are idled by the idling device. Activation of the area transmitter, on the other hand, will cause the idle device to idle go karts in at least one of the pit area and an approach area to the pit. This area transmitter includes a loop which encircles the pit area and/or the approach area. A control device with a timer is provided to automatically activate the area transmitter when a predetermined time has elapsed. The control device will also permit an operator to activate the general transmitter when an emergency situation arises. This general transmitter can idle all go karts in the operation area or can idle only one selected go kart. A kit can also be provided to adapt go karts to this system. The kit includes the receiver unit and idling device as well as a governor arm. The governor arm is connectable between the governor of the go kart engine and the idle device which includes a solenoid.

29 Claims, 6 Drawing Sheets

REMOTE CONTROL SYSTEM FOR GO KART TRACK AND GO KART CONVERSION KIT

BACKGROUND OF THE INVENTION

1. Field of the Invention

The present invention relates to a system for controlling go karts in an operation area and to a kit mountable on go karts used in the system.

2. Description of the Background Art

Go kart tracks have been known for many years. While control systems have been tried in these go kart tracks, several disadvantages have been found. For example, existing systems do not have positive control over karts entering the pit area. People can therefore come into the pit area out of control. For example, if a rider accidentally pushes the accelerator instead of the brake, the go kart can slam into other karts parked in the pit area.

Moreover, rowdy or panicked riders can impose a danger to other riders. It is often difficult to deal with such problem riders in conventional go kart tracks.

Apart from dangers to the riders, conventional go kart tracks can also be dangerous to the employees. The employees may have to walk through the pit area or on the track without any form of protection from oncoming go karts.

Also, conventional tracks have certain costs which should be avoided. For example, premiums for insurance are often high and a lot of personnel must be employed at the track. Also, riders can sometime sneak past the pit and gain an extra lap around the track without paying for it.

Besides the cost drawbacks to conventional tracks, other problems exist. For example, if there is an accident on the track, it is likely that other karts can hit the stranded car. Harm for both the riders as well as the karts is possible. Even if a collision can be avoided, conventional systems damage karts by minor bumping and pushing between go karts. Such wear and tear for the karts needs to be reduced.

Apart from damage to individual karts from being hit, conventional go karts often have many moving parts which wear and require maintenance. Thus, cost for these karts increase.

Maintenance requirements also increase with conventional systems because riders are permitted to race their go kart engines when sitting in the pit area before the ride cycle begins.

Besides maintenance problems, many states are considering requiring go karts to have cut-off switches. Many conventional systems do not meet these standards.

Conventional go kart tracks also have drawbacks in that a high degree of monitoring and care are required by the employees. Little to no automatic safety controls exist in these conventional tracks. Thus, employees must always monitor the go karts. If an employee is tired after a long shift and forgets to somehow instruct all karts to enter the pit area and stop, a dangerous situation could exist. Specifically, the employee or other customers in the pit area are at risk from a kart speeding into the pit at full throttle. Needless to say, serious injury is likely to result.

SUMMARY OF THE INVENTION

Accordingly, it is a primary object of the present invention to provide a system for positively controlling go karts in an operation area.

It is another object of the present invention to control karts entering a pit area in order to prevent the karts from slamming into one another and to thereby reduce the risk of injury to riders, operators and the karts themselves.

It is a further object of the present invention to keep karts in the pit area idled until a ride cycle begins. In this manner, drivers cannot race their engines and all riders can be securely loaded into their vehicle and the operators can be out of the way before the go karts begin to move.

Moreover, it is an object of the present invention to provide a system which not only idles karts in the approach area to the pit area but enables reactivation of karts which stop prematurely of the pit area. In this manner, all karts can easily be driven into the pit area.

It is a further object of the present invention to provide a system which is flexible. This system should be able to use radio and/or audio frequency signals to control the karts.

A further object of the present invention is to provide a system which will not interfere with movement of the karts and will not hinder riders unloading and loading from the karts.

It is still a further object of the present invention to provide a system which is automated. Such automation will make the system easier and safer to operate and will help avoid operator error.

Yet another object of the present invention is to provide a system which can easily be adapted to existing go kart tracks.

Another object of the present invention is to prevent bumping and pushing between karts thereby reducing the chance of injury to the riders, employees and karts themselves.

A further object of the present invention is to reduce the number of employees and thereby reduce the cost of the track while maintaining safety of the track.

Yet another object of the present invention is to reduce premiums for insurance by increasing the safety of the track.

Still another object of the present invention is to provide a system which will ensure that riders do not exceed a given ride cycle. In other words, it is an object of the instant system to prevent riders from sneaking past the pit area and getting an extra free lap around the track when their time is up.

An additional object of the present invention is to satisfy possible state requirements for cut-off switches or idle devices in go kart tracks.

Moreover, it is a further object of the present invention to provide a kit which has few moving parts and therefore has less wear and maintenance problems.

It is another object of the present invention to provide a system that can idle all go karts which will uniformly coast to a stop. In this manner, a driven go kart will not slam into an idled go kart. Serious accidents can therefore be avoided.

Yet another object of the instant invention is to provide a system which will enable selected go karts to be idled such individual rowdy or panicked drivers can be handled without interfering with other drivers.

A further object of the instant invention is to provide a kart track which is safer and easier to operate than conventional tracks. This object includes provision of a simple system and kit which is easy to install, operate and maintain and which is safe for both the customers and employees.

These and other objects of the present invention are provided by a system having a general transmitter, an area transmitter, at least one receiver unit on each go kart and means in each go kart for idling the engine. The general transmitter will emit a signal to idle all go karts within the operation area. The area transmitter can be used to idle go karts entering the approach area to the pit and the pit area itself. The receiver unit of the instant invention can include a kart antenna or loop pickup mounted on each kart. This receiver unit will be connected to various means such that when a signal from the general transmitter or area transmitter is received by the receiver unit, the engine of the go kart will be idled.

These and other objects of the present invention are also provided by a kit for a go kart. This kit can readily be mounted to an existing go kart or can be included during the manufacturer of the go kart. The kit includes a receiver unit, a governor arm and activation means. Upon receipt of a signal by the receiver unit, the activation means will move the governor arm to idle the engine of the go kart. In this manner, karts throughout the operation area or karts in the approach area and the pit area can positively be controlled.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description give hereinbelow and the accompanying drawings which are given by way of illustration only, and thus are not limitative of the present invention, and wherein.

DETAILED DESCRIPTION OF THE PREFERRED EMBODIMENTS

Figure 1:
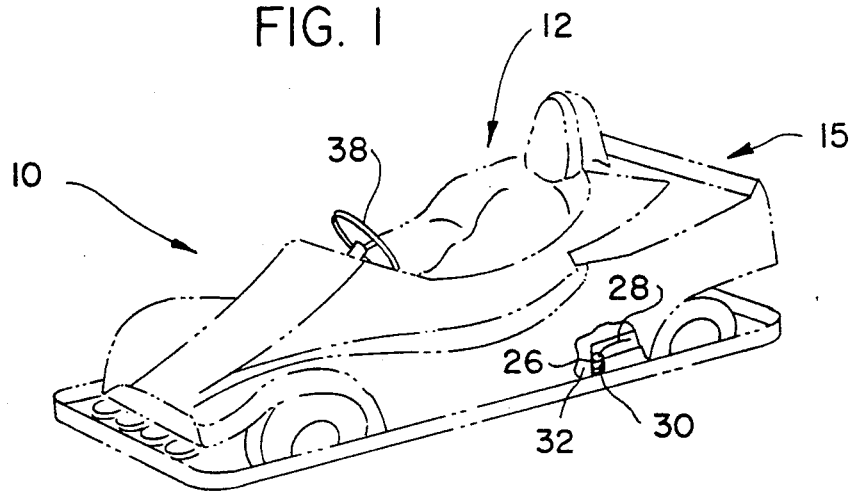
FIG. 1 is a perspective view of a go kart having a portion cut away, which go kart is used in the system of the present invention.

Referring in detail to the drawings and with particular reference to FIG. 1, a go kart 10 is shown. This go kart 10 has an area 12 in which a rider sits. At the rear 15 of the go kart 10, an engine 16 is mounted as shown in FIG. 2.

Figure 2:
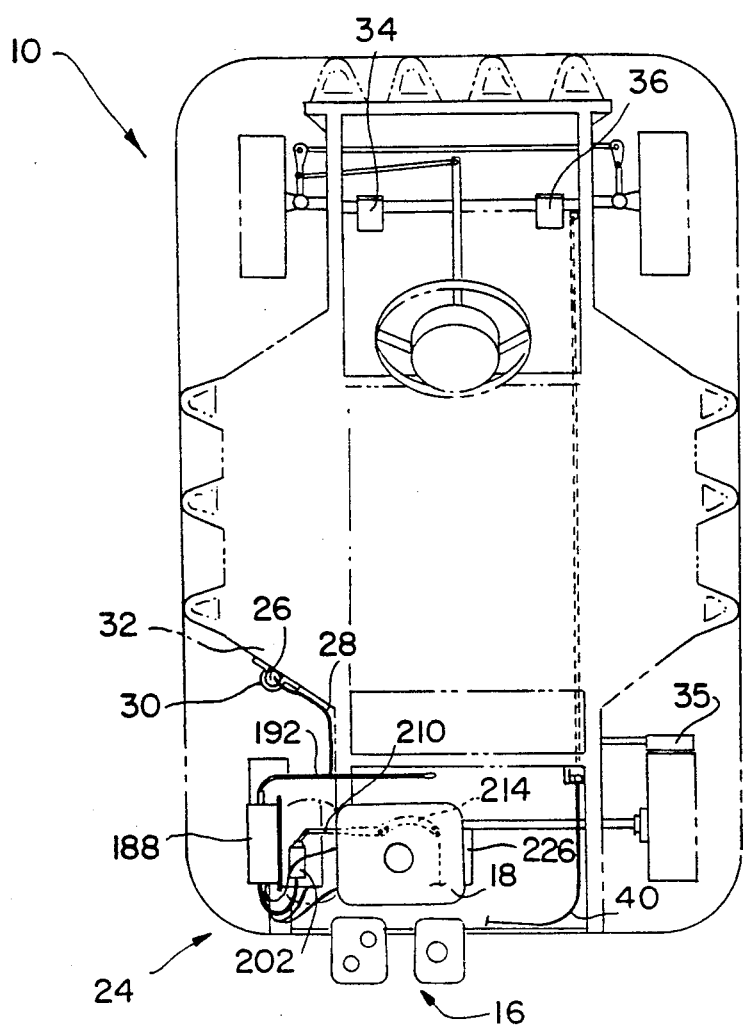
FIG. 2 is a top plan view of a go kart with the outer shell removed showing the location of a loop pickup detector and an installed kit for idling the go kart of the present invention.

While one style of go kart 10 has been shown in FIGS. 1 and 2, it should be understood that many different configurations of go karts can utilize the instant system and kit. The particular go kart configuration and engine 16 are merely given for illustration.

In this FIG. 2, the shell of the go kart has been removed showing the frame 32 and engine 16. This engine 16 has a fuel tank 18, a clutch 20 and belt drive cover 22 as shown in dotted lines. Above the clutch 20 and belt drive cover 22, a portion of a kit 24 of the instant invention is positioned. This kit 24 will be described in more detail below.

A portion of this kit 24 includes a loop pickup detector 26. This detector 26 is mounted to the frame 32 cable 28 connects the loop pickup detector to a receiving unit 188 of the kit.

As seen in FIG. 2, this loop pickup detector 26 is mounted on the rear left side of the vehicle. However, as indicated in FIG. 1, loop pickup detector 26 could be located on the rear right-hand side of the frame 32 of the vehicle. It should therefore be understood that this detector 26 can be mounted in many different positions on the go kart 10. It is merely necessary that this loop pickup detector 26 be positioned so as to receive an audio frequency signal as will be discussed in more detail below.

As further seen in FIG. 2, a brake 34 and accelerator 36 are provided below steering wheel 38. This brake 34 and accelerator 36 operate in a conventional manner. Extending from the accelerator 36 to the engine 16 is a cable 40. When the accelerator 36 is depressed by a user, this cable 40 will normally cause the engine to drive go kart 10. However, as will be discussed in more detail below, the kit 24 includes means 216 for idling the go kart 10. When the go kart 10 is idled, operation of the accelerator 36 will fail to move the go kart 10.

Upon operation of the brake pedal 34, brake pad 35 will engage some of the wheels of the go kart in order to stop the go kart. When the go kart 10 is idled by the means 216, these brake pads 35 are not automatically operated. Thus, if the go kart is moving at full speed, it will take some time before the go kart drifts to a stop. For example, when operating at 16 to 20 miles per hour, the go kart 10 will coast several hundred feet before stopping. Moreover, this distance will vary, depending upon whether the go kart is operating on flat terrain, up a hill or down a hill. Nonetheless, as will be discussed in detail below, operation of the instant invention will idle the go kart such that it will safely coast to a stop.

Figure 3:
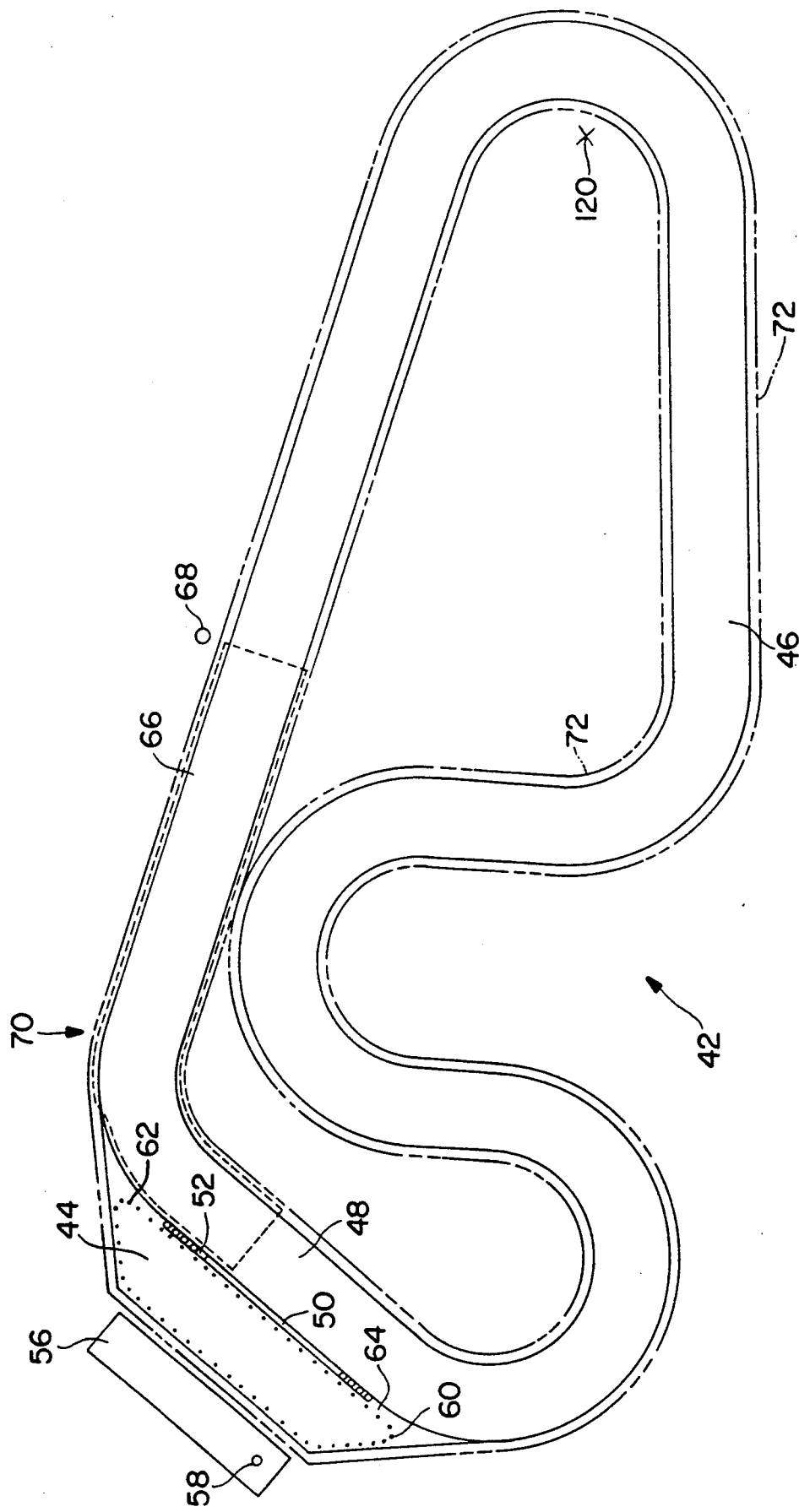
FIG. 3 is a plan view of a go kart track utilizing the system of the present invention.

Referring now to FIG. 3, a track upon which the go kart 10 can be operated is shown. Various curves and straight ways are shown on this track but it should be understood that any configuration of track is suitable for use with the instant system. For example, the instant system can be used with a track having overpasses, with an oval track or with a track having many more curves. The instant system is very versatile and can easily be adapted to existing track layouts.

In FIG. 3, the operation area 42 includes pit area 44 and track 46. It should be readily apparent that the go karts 10 can be driven from this operation area 42 to a storage area or other location if so desired. However, the instant system is primarily concerned with control of go karts in the designated operation area 42.

As seen in FIG. 3, the pit area 44 is offset from the track 46. The pit area 44 is provided to enable riders to load and unload from the go karts 10. A bypass portion 48 of track 46 is provided such that karts can avoid pit area 44 when traveling around track 46. In this manner, some riders can be loading and unloading from go karts while other riders continue to travel around track 46.

Between pit area 44 and bypass portion 48 is a divider 50. This divider can be formed by a wall, a set of tires, or a grassy strip. Within the divider is a location 52 for the stationary control unit 54. This stationary control unit 54 will be described in more detail below. It should be understood that while a particular location 52 is shown for this control unit 54, it can easily be moved if so desired. It is merely recommended that some waterproof enclosure be provided in order to house the stationary control unit 54. However, this stationary control unit 54 can readily be removed from the enclosure.

Adjacent to pit area 44 is a building 56. This building can be used to sell tickets, to shelter riders or for any number of uses. This building 56 has merely been included to indicate that an antenna 78 of the general transmitter 174 of the stationary control unit 54 can be mounted thereon at 58, for example. This antenna 78 will be discussed in more detail below.

As indicated in dotted lines in FIG. 3, the pit area 44 is generally enclosed by a pit loop 60. This pit loop 60 can encompass the entire pit area from the entry point 62 to the last possible exit point 64. This pit loop 60 can be placed in an existing saw joint or in a saw joint cut around the pit area 44. In the divider 50 between the bypass portion 48 and pit area 44, the pit loop 60 can either be placed in a saw joint or placed underneath the tires or wall forming the divider 50.

Generally, this pit loop 60 is provided such that it will not be stepped on by users or run over by the go karts 10. In this manner, damage to the pit loop can be avoided. It is important that the side of the pit loop 60 next to the divider 50 be placed on the pit side of the divider 50 such that this pit loop does not interfere with go karts on the bypass portion 48 of the track during operation thereof.

While this pit loop 60 has been discussed as being buried, it should be understood that a portion of this pit loop can be buried if so desired. For example, the riders could step over this pit loop when entering or exiting the vehicles. However, this design is not recommended. The pit loop 60 would not be out of the way and could easily be damaged or trip a rider. By burying the pit loop, the risk of damage or a rider tripping will be avoided.

This pit loop 60 is formed from a 14 gauge stranded direct burial cable. The pit loop 60 will be operatively connected to the stationary control unit 54 as will be discussed in more detail below.

Before the pit area 44, an approach loop 66 is provided. This approach loop 66 should encompass the area from the entry of the pit 62 to a stop light 68. This approach loop 66 can also continue into at least a section of the bypass portion 48.

As discussed above, when coming to a stop, a go kart operating at 16-20 miles per hour will require several hundred feet before coasting to a stop. This distance will depend upon whether the go karts are on flat terrain, running uphill or downhill. Therefore, in designing the approach loop 66, the length from the entry 62 of the pit area 44 can be varied. If the track is flat coming into the pit area 44, it is suggested that the approach loop 66 extend at least 100 to 125 feet from the entry 62.

Similarly to the pit loop 60, the approach loop 66 is formed from 14 gauge direct burial cable. It should be understood that while an example 14 gauge direct burial cable has been discussed for both the pit loop 60 and approach loop 66, any suitable transmitter arrangement can be used. The pit loop 60 and approach loop 66 can be collectively thought of as area loop 70. Rather than providing two separate loops 60 and 66, a single area loop 70 could be provided. Use of this area 70 or two loops 60 and 66 will be discussed below.

When placing the wire of the pit loop 60 or approach loop 66 or area loop 70 in a saw joint, it is recommended that the saw joint be approximately 3/16 to ¼ inches wide. Once the wire is placed in this crack, a commercial saw joint sealing compound can be placed over it. For example, a liquid-type epoxy compound or pool sealer can be poured over the wire to prevent it from popping out and being potentially damaged.

If a new track is being laid out, the wire can be placed directly beneath the track and the asphalt or concrete can be laid over it. Alternatively, the wire can be placed in fresh cement, for example. However, it may be easier to simply place the wire in a saw joint rather than try to place the wire in fresh cement. By having the wire of the pit loop 60 and approach loop 68 or area loop 70 covered, it is protected from damage and a break in the loop is avoided.

When burying the pit loop 60 and approach loop 66 or a single loop 70, the wires can be placed within an inch to an inch and a half below the surface of the dirt surrounding the track or in a saw joint encompassing the same area just inside a steel rail surrounding the track.

At the furthest point of the approach loop 66, the stop light 68 can be positioned. When the stop light 68 is actuated, riders will know that their time is up and that they should enter the pit area 44. This stop light 68 is automatically activated by the stationary control unit 54. Moreover, this stop light 68 is optional to the instant system. Nonetheless, it provides an added safety factor by letting riders know that the ride cycle is over. This stop light can have a green light which is activated during the ride cycle and a red light, red arrow pointing toward the pit or a sign indicating that the ride is over, for example.

Throughout this disclosure, a ride cycle will be discussed. This ride cycle does not necessarily correspond to the number of laps a go kart can make around the track, but is a predetermined amount of time the karts are allowed to operate. For example, a rider can ride for about four minutes on one ticket before his ride cycle is complete. The time for this cycle can be set according to a number of factors such as competitor's ride cycle time.

When the ride cycle is over, the area loop 70 is actuated, and the stop light 66 is in turn actuated. At this time, when the go karts 10 enter the approach loop 66, their engines 16 will idle. Even if the rider tries to depress the accelerator 36, the go kart 10 will not be driven unless the area loop 70 or a portion thereof is deactivated.

As further indicated in FIG. 3, an optional general loop 72 can be provided around the entire operation area of 42. Similarly to the pit loop 60, approach loop 66 and the area loop 70, this general loop 72 can be a direct burial cable wire or any other suitable design. Also, the exact positioning of this general loop can be changed dependent on track requirements. Use of this general loop 72 will be discussed below. Each of these loops 60, 66, 70 and 72 will emit a very low frequency audio frequency wave signal. Karts which are four to five feet outside one of these loops will be unaffected by this signal.

Figure 4:
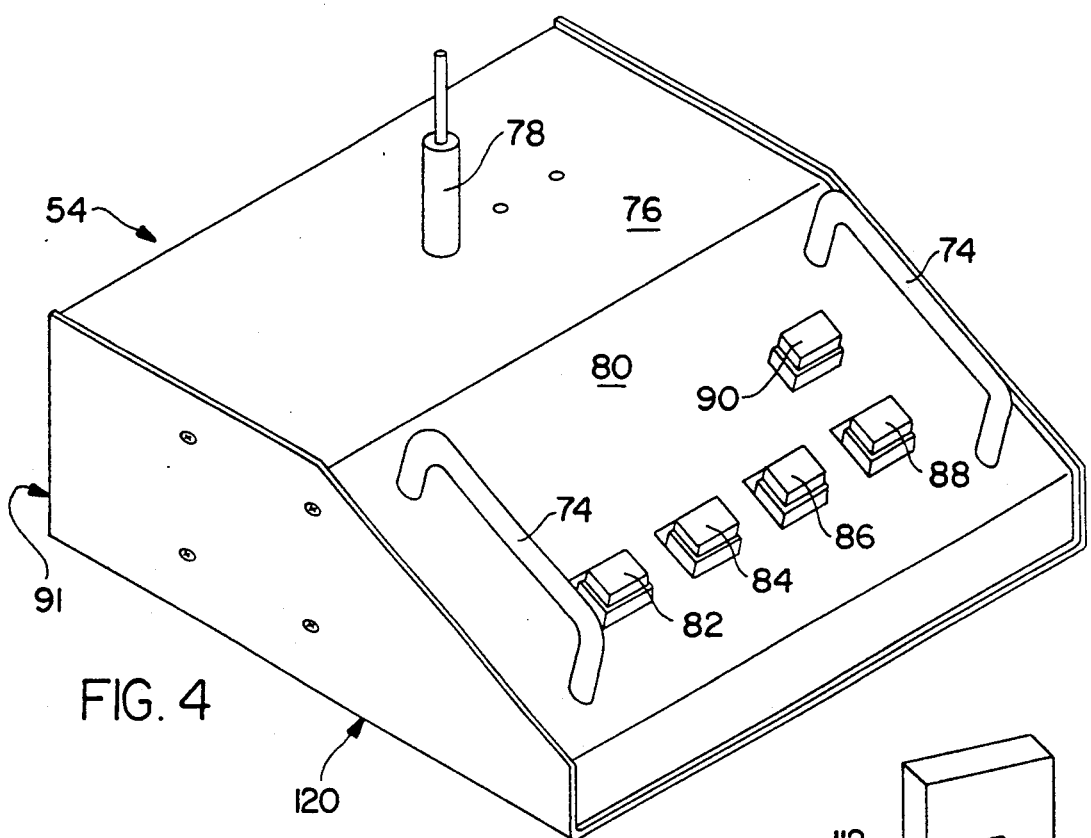
FIG. 4 is a perspective view of a stationary control unit of the control means of the present invention.

Now referring to FIGS. 4–6, the stationary control unit 54 will be discussed. This stationary control unit 54 can be positioned in location 52 as noted above. Alternatively, any other suitable location can be used. As can be seen on this stationary control unit 54, handles 74 are provided. Thus, this control unit can be moved. It is merely referred to as a "stationary" control unit, because it is generally intended that this control unit 54 remain in one position during operation.

On the top 76 of the stationary control unit 54 is the antenna 78 which was previously discussed. While this antenna 78 is shown as being mounted on the top 76 of the stationary control unit 54, this antenna 76 can be unscrewed and mounted on a building 56 or other structure. The antenna 76 can be an approximately three foot stainless steel wire or it can be a slidable antenna like those used for a car radio antenna. This slidable type of antenna has an advantage in that it can be closed to a compact size which is convenient for shipping. It should nonetheless be recognized that any suitable form of antenna 78 can be used.

On the front panel 80 of the stationary control unit 54, various controls are mounted. These controls include a power switch 82, a first switch 84, a second switch 86, a non-movable pit loop indicator 88, and a timer switch 90. While a certain configuration has been shown on the front panel 80, it should be understood that any desired configuration can be used for these switches and indicator.

The power switch 82 is provided for turning the stationary control unit 54 on and off. When this power switch 82 is depressed, it can be illuminated to show the stationary control unit 54 is on.

Next to the power switch 82 is the first switch 84. This first switch 84 will stop all go karts 10 in the operation area 42. As will be discussed in more detail below, this first switch 84 is connected to a general transmitter 174.

This general transmitter 174 can be the antenna 78 or the general loop 72. If an antenna 78 is used, depression of the first switch 84 will send a radio signal throughout the operation area 42. Alternatively, if a general loop 72 is used, depression of the first switch 84 will send an audio frequency signal throughout the operation area 42. Either the radio signal or audio frequency signal will cause all go karts 10 within the operation area 42 to idle. Thus, all karts will drift to a stop.

On the front panel 80 of the stationary control unit 54 is a second switch 86 next to the first switch 84. This switch 86 acts to override the timer means 142 shown in FIG. 8. Operation of the second switch 86 and timer means 142 will be described in detail below.

On the lower right-hand side of the front panel 80 of the stationary control unit 54, a nonmovable pit loop indicator 88 is provided. Upon activation of pit loop 60 by the timer means 42, this indicator 88 will be illuminated.

Figure 8:
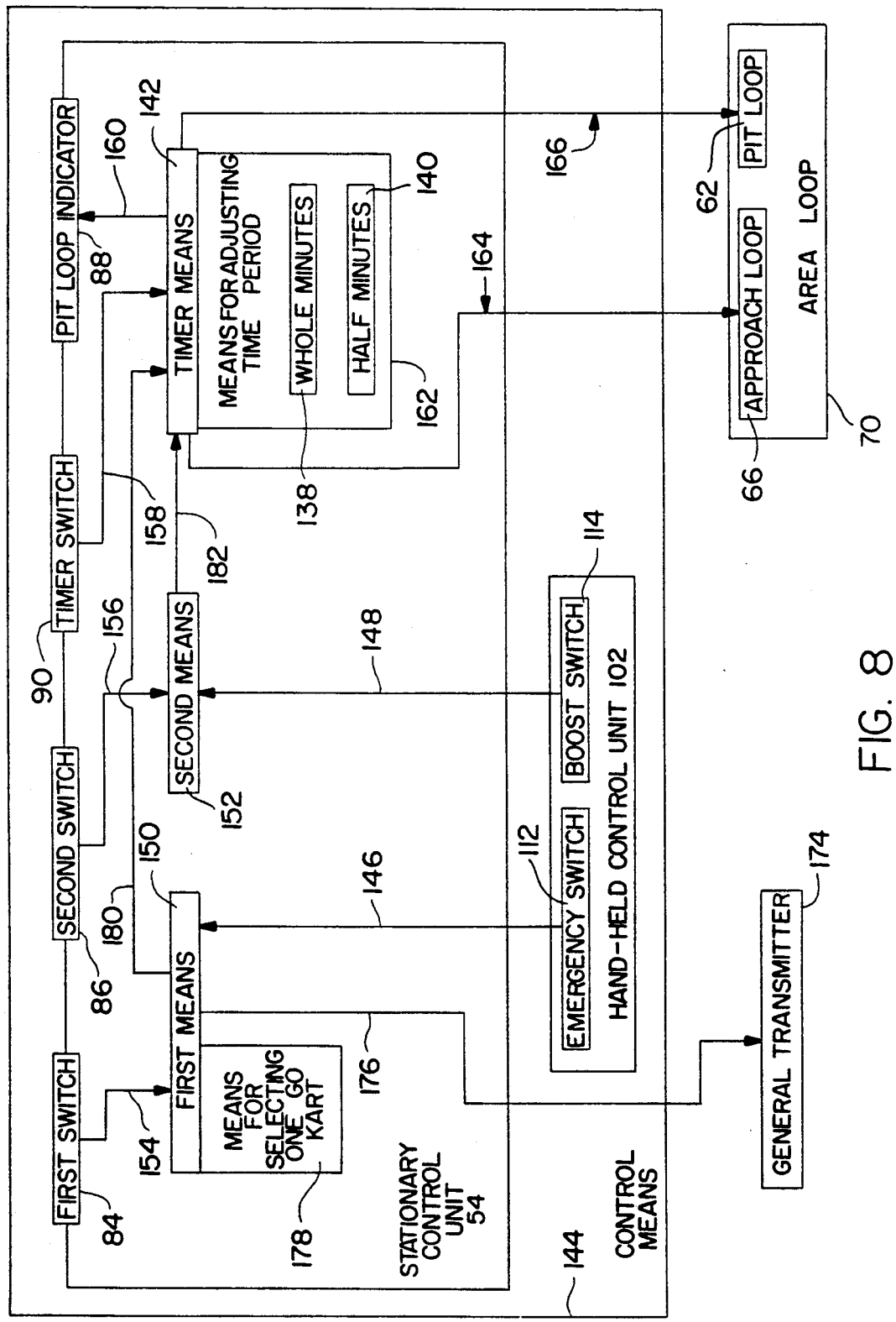
FIG. 8 is a block diagram showing the control means, general transmitter and area loop of the present invention.

Finally, above the pit loop indicator 88, a timer switch 90 is provided. This timer switch 90 is operatively connected to the timer means 142 as indicated in FIG. 8.

Figure 5:
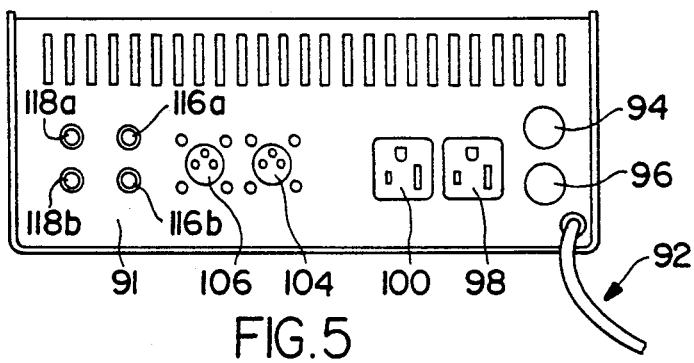
FIG. 5 is the rear view of the stationary control unit of the present invention.

Now referring to FIG. 5, the back 91 of the stationary control unit 54 is shown. Proceeding from left to right, a power cord 92, a five amp fuse 94 and a one amp fuse 96 are shown. The power cord 92, five amp fuse 94 and one amp fuse 96 are operatively connected to power means within the stationary control unit 54. This power means is also operatively connected to the power switch 82. For simplicity, this power means has not been shown in FIG. 8. Nonetheless, it should be understood how this power means operates.

Next to the fuses 94, 96 in FIG. 5 are two plugs 98 and 100 for the stop light 68. A hard wire connection can run from stop light 68 to the stationary control unit 54. These wires are plugged into plugs 98 and 100. The red "stop" signal of the stop light 68 can be connected to the stationary control unit 54 through plug 98 and the green "go" signal of the stop light can be connected to the stationary control unit 54 through the plug 100, for example. While a hard wire connection is not shown from the stationary control unit 54 to the stop light 68, it should be understood how this connection is made. Rather than using a hard wire connection, it is also possible to use a radio frequency or other communication arrangement between the stationary control unit 54 and the stop light 68. If a radio frequency or audio frequency is used, the frequency thereof should be different from the frequency emitted by the pit loop 60, approach loop 66, area loop 70 and general loop 72.

Figure 7:
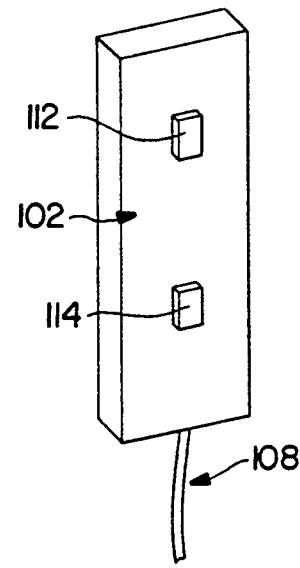
FIG. 7 is a perspective view showing the hand-held control unit of the control means of the present invention.

Next to the two plugs 98, 100 are remote control connections 104 and 106. These connections connect the stationary control unit 54 to a remote hand-held control unit 102 as seen in FIG. 7. On the bottom of the hand-held control 102 is a cable 108. Within this cable are two wires which can be plugged into the connections 104 and 106. Similarly to the stop light 68, any form of communication between the hand-held control 102 and stationary control unit 54 is possible.

If a hard wire connection is used, the cable 108 can be up to 50 feet in length in order to enable the operator to travel over a wide area. Thus, when holding the remote unit 102, an operator is free to move around the pit area 44. In fact, the hard wire connection can be long enough such that the operator can walk anywhere in the operation area 42. Alternatively, a buried cable or other communication means from the stationary control unit 54 and a location 120 distant from the stationary control unit 54 can be provided. This distant location 120 can have a connection for hooking the cable 108 of the remote control unit 102 thereto. In this manner, one operator can be positioned in the area of the stationary control unit 54 while another operator can be positioned at another portion of the track. By having operators located throughout the track, management can have better control of the track. The particular remote location 120 shown in FIG. 3 is merely exemplary. It should be understood that any suitable location can be chosen for the connection of the cable 108 of the hand-held control unit 102.

On the hand-held control unit 102, an emergency switch 112 and a boost switch 114 are shown. This emergency switch 112 works similarly to the first switch 84 to cause the antenna 78 or general loop 72 to issue a radio signal to stop all go karts 10 in the operation area 42. Likewise, the boost switch 114 acts similarly to the second switch 86 in order to override the timer means 142 as will be described in more detail below.

Both the first switch 84 and the emergency switch 112 are toggle type switches. Specifically, when they are depressed, they will be held in position until they are again depressed and thereby released. In this manner, once the antenna 78 or general loop 72 is activated, the radio signal or audio frequency signal will be continually issued until the switch is deactivated. In that manner, when an emergency situation arises, all karts 10 can be sent to idle and coast to stop. Until this emergency situation is corrected, the go karts will not the activated switch 84 or 112 can be released for the go karts to resume travel.

Returning now to FIG. 5, four plugs 116A, 116B, 118A and 118B are shown on the left-hand portion of the rear 91 of the stationary control unit 54. Two of the plugs 116A and 116B are connected to the approach loop 66. Thus, one end of the wire forming the approach loop can be inserted into plug 116A and the other end can be inserted into plug 116B. In this manner, a circuit for the approach loop 66 is obtained. Similarly, plugs 118A and 118B can be connected to the ends of the wire for the pit loop 60. In this manner, the stationary control unit 54 can be hard wire connected to both the approach loop 66 and pit loop 60. However, rather than using a hard wire connection, any other communication means between these loops is suitable. If only one area loop 70 is used, then only one set of plugs can be provided.

Additionally, it should be understood that while only two sets of plugs 116A, 116B and 118A, 118B are shown, a third set of plugs (not shown) can be used. A sufficient number of plugs can be provided such that the general loop 72 can be plugged into the stationary control unit 54. Because the stationary control unit 54 shown in FIGS. 4 and 5 uses an antenna 78, plugs for the general loop 72 are not shown on the rear 91 thereof. However, even if an antenna 78 is used, it is contemplated that both a connection for the antenna 78 and for the general loop 72 can be provided. In this manner, the stationary control unit 54 can readily be switched between radio signals issued from an antenna or other audio frequency signals issued from a general loop 72. The stationary control unit 54 is therefore readily adaptable to the needs of a particular track.

Figure 6:
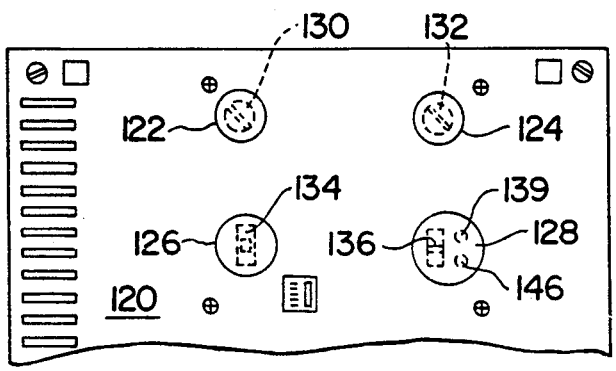
FIG. 6 is a bottom view of the stationary control unit of the present invention.

Turning now to FIG. 6, the bottom 120 of the stationary control unit 54 is shown. The bottom 120 of this stationary control unit 54 has four round chrome plug covers 122, 124, 126 and 128. These covers and their associated switches can be arranged in many different configurations. These chrome plug covers can be popped from the bottom 120 of the stationary control unit 54 in order to expose switches shown in dotted lines beneath them. Rather than using round chrome plug covers, any suitable covering can be used for the switches. Alternatively, if a cover is not desired over the switches due to the need for frequent adjustments, then these covers 122 through 128 can be omitted. It will be noted that one of the chrome plug covers 128 is slightly larger than the other covers 112, 124 and 126.

Beneath the first chrome plug 122 is a switch 130. This switch can be turned by a screwdriver or the like. Upon removing the chrome plug cover 122 and turning switch 130, the audio strength emitted by the pit loop 60 can be varied. Similarly, beneath chrome plug cover 124 is a switch 132. This switch 132 can also be adjusted by a screwdriver in order to increase the audio strength of the approach loop 66. While switches 130 and 132 are shown as being operated by the screwdriver, any suitable switch can be used. By moving these switches, the frequency of the pit loop 60 and approach loop 66 can be varied between high, medium and low. In this manner, if go karts 10 in the approach loop 66, for example, are not responding to the audio frequency signal, the frequency of this signal can be increased. This is particularly useful if the track is wide or if there is some interference with the signals emitted by the approach loop 66. Similar setting for the audio frequency signal for the pit loop 60 can be obtained with switch 30.

Beneath the chrome plug cover 126 is a toggle or slide switch 134. This slide switch 134 will control pit loop 60 to be continuously on, in normal mode or continuously off. Similarly beneath chrome plug cover 128 is a toggle or slide switch 136 that is movable between an on, normal and off position. This slide switch 136 will control operation of the approach loop 66. By sliding these switches 134 and 136, the pit loop 60 and approach loop 66 can be placed in a desired condition. For example, if it is desired to continuously stop the karts, the switch 134 and/or 136 can be put in the on position. Therefore, when any go kart enters the pit loop 60 and/or approach loop 66, it will be idle such that it cannot be driven from this position. If the system is to operate under normal conditions, the switches 134 and 136 are placed in the normal condition. If it is desired that the go karts are free to travel around the operation area 42 for any length of time, the switches 134 and 136 can be put in the off position. It should be recognized that if a general loop 72 is also used, a similar slide switch can be provided in a suitable location.

Beneath chrome plug cover 128 a minute switch 136 and half-minute switch 140 are also provided. By depressing the minute switch 136, the predetermined time for a ride cycle can be input in minutes to the timer means 142. Similarly upon depression of the half-minute switch 140, half-minute increments can be added to the ride cycle. Thus, a ride can last anywhere from zero to one-half to one to one and a half, etc. minutes. It is contemplated that the average ride will about four to five minutes. This time will vary depending on the time required to make a full circuit of the track 46. Thus, at least the last go kart 10 by the pit area 44 should be allowed to make one complete cycle around track 46 before reaching the entry of the pit area 44. The amount of time on the ride will therefore depend on the size of the track 46 as well as the time allowed at competitors' tracks in the local market. Other factors can also be used in selecting this time. Regardless of the number of times a go kart 10 is able to travel around track 46, the timer means 142 can be set for a predetermined time. When this predetermined time has elapsed, the ride cycle is over. The timer means 142 will then actuate the approach loop 66 and pit loop 60.

Referring now to FIG. 8, operation of this timer means 142 and the other control means 144 will now be discussed. The control means 144 is comprised of the stationary control unit 54 and the hand-held control unit 102. It should be understood that the stationary control unit 54 shown in FIG. 8 is merely a diagrammatic representation. The power switch 82 and power means within the stationary control unit 54 are not shown in this figure for simplicity.

As previously noted, this hand-held control unit 102 comprises an emergency switch 112 and a boost switch 114 connected through cable 108 to the stationary control unit 54. Within this cable 108 are connections indicated by lines 146 and 148, respectively. These lines 146 and 148 are connected to a first means 150 and second means 152. This first and second means 150 and 152 are contained within the stationary control unit 54. The first switch 84 and second switch are also connected to these means 150 and 152 by lines 154 and 156, respectively.

The timer means 142 within the stationary control unit 54 is connected to the timer switch 90 by line 158. Timer means 142 will issue a signal to the pit loop indicator 88 on the front panel 80 of the stationary control unit 54 through line 160 when the pit loop 62 is activated. The timer means 142 is also operatively connected to the minute switch 138 and half-minute switch 140 which were discussed above. These switches 138 and 140 along with other controls make up a means for adjusting the time period 162.

When using the instant system, an operator can decide the minimal amount of time go karts should be allowed to travel around track 46. This predetermined amount of time will be the ride cycle. This ride cycle can then be input into the timer means 142. When the timer switch 90 is actuated, the timer means 142 will begin counting time. When the predetermined amount of time corresponding to the ride cycle has elapsed, the timer means 142 will issue a signal through line 164 to the approach loop 66 and through line 166 to the pit loop 62. These signals will actuate the approach loop 66 and pit loop 66 to emit an audio frequency signal. Go karts 10 entering these areas will then be idled such that they coast to a stop. Also upon actuating these signals, the timer means 142 will illuminate the pit loop indicator 88 by issuing a signal through line 160. Thus, whenever the pit loop 62 is actuated, the pit loop indicator 88 will be illuminated.

Upon actuating the first switch 84 of the stationary control unit 54 or the emergency switch 112 of the hand-held control unit 102, the first means 150 will issue a signal through line 176 to the general transmitter 174. This general transmitter 174 will either be an antenna 78 or a general loop 72. When the antenna 78 is the general transmitter 174, a radio signal will be issued to go karts within the operation area. This radio signal can control karts within a one-half mile range. If it is not desired to use a radio signal and the general loop 72 is used instead, an audio frequency signal will be emitted upon actuation of the general transmitter 174.

Both the radio signal or audio frequency signal will cause all go karts within the operation area 42 to idle. The go karts will then coast to a stop. In this manner, when an emergency situation arises, all karts can be stopped. When the first means 150 is actuated, a signal can be sent to the timer 142 through line 180. This signal will interrupt the counting of the timer means 142. In this manner, riders will not loose time from their paid ride cycle when an emergency situation arises.

Such an emergency situation can include an accident on a track, a panicked rider or any other scenario in which all karts should be stopped. By idling all karts, the instant system has several unique advantages. For example, if only one kart were to stop, and other karts continued to move around the track 46, the powered karts could easily ram into the stopped kart. However, if it is desired to use a system wherein one particular kart is stopped, the means 178 for selecting one kart can be actuated. This means 178 is operatively connected to the first means 150. By providing this means 178, a particular rowdy rider or panicked rider can be selected and their kart idled. With such control, other riders can continue to enjoy their rides while the problematic rider is dealt with.

Other advantages are also obtained by providing the means 178. However, if such a means 178 is used, care should be taken such that idling of the selected go kart will not result in danger of it being rammed from approaching karts. This means 178 as shown in FIG. 8 but has not been indicated on the stationary control unit 54 seen in FIG. 4. It should be understood that selection switches for choosing one particular go kart can be provided on the front panel 80 of the stationary control unit 54. When using this means 178, the general transmitter 174 should be the antenna 78 which emits a specific radio signal from the selected part. It is still positive, nonetheless, for this antenna 78 to issue a broad band signal such that all go karts are stopped.

Operation of the control means 144 will now be described. Before a ride cycle begins, riders can load into the go karts 10 positioned in the pit area 44. It should be understood that the audio frequency system can be used with a single go kart 10 or with a plurality of go karts. Once all riders are safely buckled into their go karts, the timer switch 90 can then be pressed by an operator. This timer switch 90 will send a single through line 158 to the timer means 142. The timer means will then begin to count the time period. The general transmitter 174 and pit loop 60 and approach loop 66 are all turned off. Riders are then free to travel out of the pit area 44 and around the track 46 throughout the operation area 42. Riders can continually encircle the track 46 until the timer means 142 determines that the predetermined period of time has lapsed.

When this predetermined time period is up, the ride cycle is over. The timer means 142 will issue signals through lines 164 and 166 to the approach loop 66 and pit loop 62 whereafter these loops emit an audio frequency signal. The timer means 142 can also be connected to the stop light 68. Upon lapse of the ride cycle, the stop light 68 can be illuminated to inform riders to return to the pit area 44.

If an emergency situation arises and all karts traveling throughout the operation area 42 should be stopped, the first switch 84 of the stationary control unit 54 or the emergency switch 112 of the hand-held control unit 102 can be actuated. Signals will be sent to the first means 150 which will then send a signal to the general transmitter 174 through line 176. As noted above, the general transmitter 174 can be either the antenna 78 or the general loop 72. When the general transmitter 174 is actuated, a radio signal (if the antenna 78 is used) or an audio frequency signal (if the general loop 72 is used) can be issued in order to stop all go karts within a half-mile range. The emergency situation can then be dealt with.

Alternatively, if the means 178 for selecting one go kart is used, the general transmitter 174 can be used to send a signal to that one particular go kart to cause it to idle. To stop the first means 150 from signalling the general transmitter 174 through line 176, the switch 84 or 112, which was actuated has to be deactivated. In this manner, the operators can have ample time to deal with the situation. A line 180 is also provided between the first means 150 and the timer means 142 such that when the first means is actuated, the timer 142 will stop counting time. In this manner, riders can have a full ride cycle even if an emergency situation arises. Users therefore get their money's worth.

When the timer means 142 has actuated the pit loop 62 and approach loop 66, some riders might stop short of the pit area 44. Because these go karts are idled, they would be stuck if it were not for the provision of the second means 152. Upon actuating the switch 86 of the stationary control unit 54 or the boost switch 114 of the hand-held control unit 102, the second means 152 will be actuated. Upon actuating the second means 152, a signal will be sent through line 182 to the timer means 142. This will cause the timer means to stop issuing the signal through line 164 to the approach loop 66. The approach loop 66 will no longer emit an audio frequency signal. In this manner, cars within the approach loop 66 are no longer forced to idle and can drive into the pit loop 44. These cars will usually only have a small area to travel and will therefore not obtain a high speed which could create problems within the pit area 44.

When the second means 152 no longer sends the signal through line 182 to the timer means, the timer means will then send the signal 164 to actuate the approach loop 66. Accordingly, when the timer means 142 determines the end of a ride cycle and the approach loop 66 and pit loop 62 are actuated, the second means 152 could then be actuated in order to deactivate the approach loop 66. Go karts within the approach loop 66 can then travel into the pit area 44. The pit loop 62 continues to be actuated by the timer means 142 even when the second means 152 causes the timer means 142 to deactivate the approach loop 66. Thus, cars already in the pit area 44 cannot escape.

It should be understood that while both an approach loop 66 and pit loop 62 have been disclosed, a single area loop 70 can be used. When the second means 152 is used with a single loop 70, signals within both the approach area and pit area 44 are terminated such that go karts 10 are free to move throughout this area. Thus, some of the control of the instant system is lost when a single loop 70 is provided. However, by providing only a single loop 70, the instant system is less expensive to manufacture, install and maintain. Other advantages should be apparent to either arrangement of two separate loops 62 and 66 or a single loop 70 for this area. When both an approach loop 66 and a pit loop 62 are used, they can be thought of as an area loop 70 as noted above, because upon termination of the ride cycle, the timer means 142 will automatically activate both loops.

Figure 9:
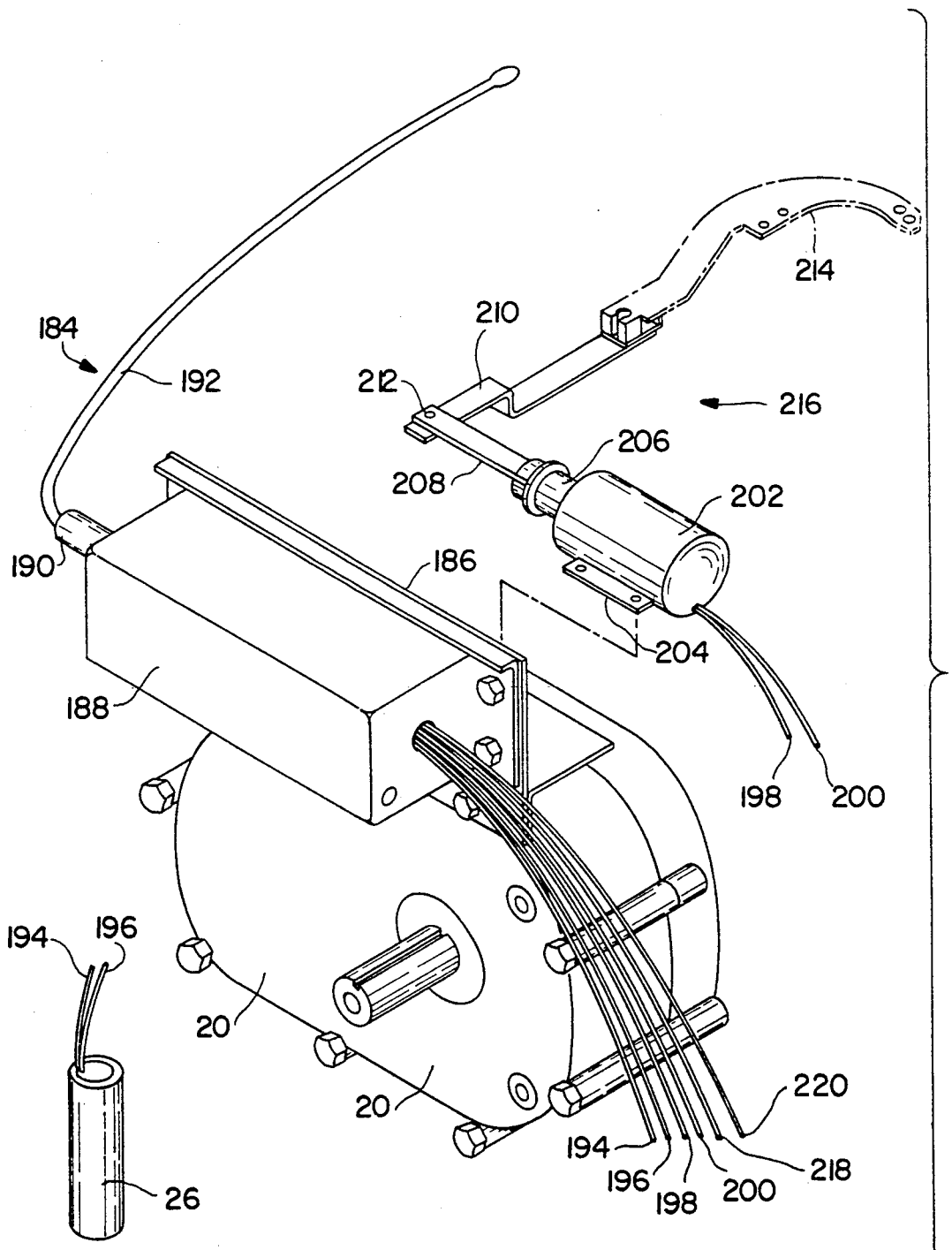
FIG. 9 is an exploded view showing the kit of the present invention partially mounted above a clutch.

Turning now to FIG. 9, the kit 24 of the instant invention will now be described. This kit 24 includes various components which are to be mounted on individual go karts 10. These elements include a bracket 186 which is mounted on the clutch 20. While not shown in FIG. 9, this clutch 20 is next to a belt drive having a belt drive cover 22 as seen in FIG. 2.

Mounted to bracket 186 is a receiving unit 188. This receiving unit 188 can include a solid-state receiver with a unique capacitor. Specifically, a hole can be drilled in the casing of the capacitor and epoxy filled within the capacitor. This epoxy will ensure positioning of the dielectric material between the metallic plates of the capacitor. In this manner, the capacitor will not fail over extended use in the go kart 10. This capacitor 10 is subject to rattles and vibrations. By using this epoxy filled capacitor, the need for maintenance of the receiving unit 188 is reduced.

Extending from a forward side of the receiving unit 188 is an antenna connector 190 and a kart antenna 192. This connector 190 and kart antenna 192 are used when the general transmitter 174 is an antenna 78. If a general loop 72 is used, on the other hand, this connector 190 and kart antenna 192 can be omitted if so desired. In order to maintain consistency in manufacturing, all receiving units 188 can be provided with the connector 190 and 192. However, when used in a system having a general loop 72, this antenna 192 would normally not be used. Nonetheless, provision of this kart antenna 192 and antenna 78 as the general transmitter can be retained as a fail safe even when the ground loop 72 is used. Specifically, the antenna 78 can broadcast a radio signal if the loop pickup detector happens to fail or fall off the kart.

Rather, the loop pickup detector 26 would be used. This loop pickup detector 26 has been discussed with reference to FIG. 1. The loop pickup detector 26 is mounted to the frame 32 of the go kart 10 by a loop pickup detector bracket 30. This loop pickup detector 26 will not only receive the audio frequency signal from the general loop 72 but will also receive the signals from the area loop 70, the pit loop 60 and the approach loop 66. The audio frequency signal emitted by this loop or loops will be picked up by the loop pickup detector 26. The loop pickup detector 26 is connected to the receiving unit 188 by wires 194 and 196. These wires 194 and 196 can be twisted together to form the cable 28 shown in FIG. 1.

Also extending from the receiving unit 188 are wires 198 and 200. These wires 198 and 200 are connected to a solenoid 202. This solenoid 202 is mounted to the bracket 186 as indicated by the dotted lines in FIG. 9. A bracket 186 can separate the receiving unit 188 and solenoid 202 or the bracket can be generally flat such that the receiving unit 188 and solenoid are placed without any obstruction therebetween. Other shapes of brackets 186 can also be used.

A flange 204 is provided for mounting the of the solenoid is a plunger 206. This plunger is connected to a governor link 208 which is pivotally connected to a governor arm 210 at connection 212. This governor arm 212 can then be connected to the governor 214 of the engine 16. The governor arm 210 can be soldered to the governor 214 to form a rigid connection therebetween. This governor 214 is generally standard equipment on the engine 16. For example, the engine 16 can be a Honda 5 horse power engine or any other suitable drive means.

As seen in FIG. 2, the governor arm 210 is generally mounted beneath the fuel tank 18 of the engine. A 90° bend in the governor arm 210 is provided therein such that the fuel tank 18 will not interfere with movement of the governor arm 210. The solenoid 202 and the receiving unit 188 are mounted next to the fuel tank 18 above the clutch 20 and belt drive cover 22 as discussed above. The kart antenna 192 extending from the front end of the receiving unit 188 extends below the fuel tank 18.

Returning now to FIG. 9, the solenoid 202, plunger 206, governor link 208 and governor 210 can all be considered as a means for idling 216. The solenoid 202 can also be considered to be an activation means. The loop pickup detector 26, antenna 192 (if used) and the receiving unit 188 can all also be though of as a receiving unit.

The antenna 192 can be a wire antenna covered with plastic or 20 gauge stranded wire which is draped around the engine compartment. The 20 gauge stranded wire is about three feet long. Thus, different types of antennas than those shown in FIG. 9 can be used.

Figure 10:
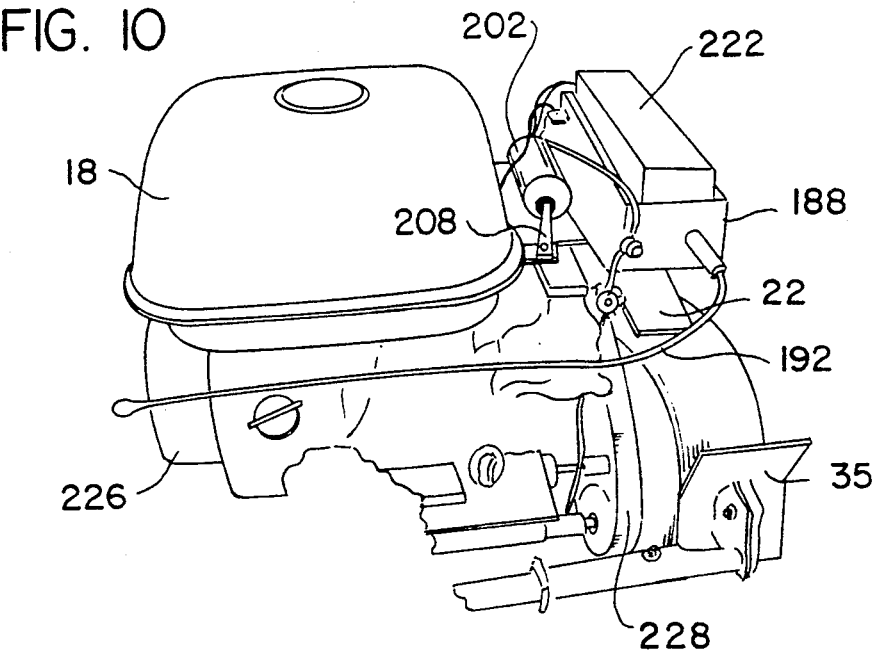
FIG. 10 is a front view of the kit of the present invention mounted on a go kart.
Figure 11:
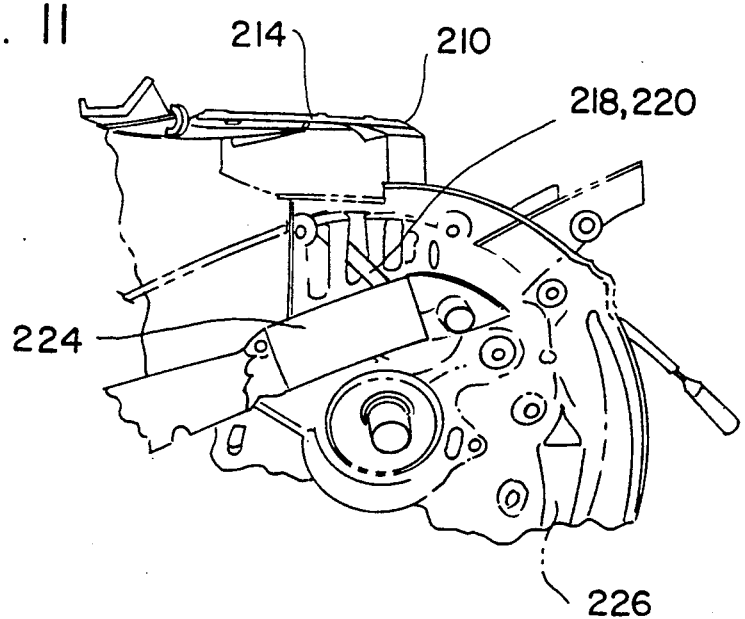
FIG. 11 is a view for explaining the mounting of a coil of the present invention in the flywheel of a go kart engine.

Two additional wires 218 and 220 are also shown extending from the receiving unit 188. These wires are connected to a power source which will either be a battery 222 or a coil 224 as indicated in FIGS. 10 and 11, respectively. The battery 222 shown in FIG. 2 is seen mounted above the receiving unit. However, it should be appreciated that different size batteries and locations for these batteries can be used. Moreover, it should be appreciated that while each set of wires from the receiving unit 188 is shown as a pair, any communication means between the receiving unit 188 and the various components can be used. For example, wires 194 and 196 between the receiving unit 188 and the loop pickup detector 26 can be replaced by a fiber optic pathway or any suitable communication device.

In FIG. 10, the positioning of the various components of the kit 24 relative to the engine and fuel tank 18 can be seen. Because the governor arm 210 extends beneath the fuel tank 18, it cannot be seen in this figure. However, the belt 228 under the belt drive cover 22 can be seen. By provision of the battery 222, the receiving unit 188 can be powered.

Alternatively, instead of using a battery 222, a coil 224 can be utilized with the flywheel 226 of the engine as shown in FIG. 11. This coil 224 is connected to the receiving unit 188 through wires 218 and 220. In FIG. 11, the flywheel has been indicated as 226. It should be recognized that this is actually the flywheel cover with the wheel itself removed for clarity. However, the cover and the entire wheel structure are together thought of as the flywheel 226. By providing the coil 224, a separate battery or other power source is not necessary. Charging of the battery is therefore avoided and maintenance requirements to the go kart can be reduced. This coil 224 can be easily installed within the flywheel 226 by removing the flywheel and its outer cover. Thus, this coil 224 is readily adaptable to the existing go karts similarly to the battery 222 system.

In fact, all of the components of the kit 24 are easily mountable onto existing go karts. However, go karts can also be initially manufactured with this kit 24.

Operation of the kit 24 will now be described. As the go karts travel around the track, power will be supplied to the receiving unit 188 by either the battery 222 or the coil 224. It is contemplated that both a battery 222 and coil 224 will not be simultaneously used.

If an antenna 78 is used as a general transmitter 174, the radio signal will be picked up by the kart antenna 192. If, on the other hand, a general loop 72 is used as the general transmitter 174, the loop pickup detector 26 will receive this audio frequency signal. When either signal is received, the receiving unit 188 will activate the solenoid 202. Solenoid 202 will then move plunger 206 and governor link 208. The governor arm 210 pivot to the governor link 208 will then be moved to affect the governor 214. In this manner, the engine 16 of the go kart 10 will be idled. A moving go kart will then coast to a stop.

Moreover, if a ride cycle is over and the timer means 142 actuates the area loop 70, the approach loop 66 and pit loop 62, the loop pickup detector 26 will receive the audio frequency signal. This loop pickup detector 26 will then send the signal to the receiving unit 188 which will activate solenoid 202. Again, solenoid 202 will cause the governor arm 210 to move such that the governor 214 will idle the engine 16 of the go kart 10. Again, the go kart will come to a stop. If the second means 152 overrides the timer means 142 to stop power supply to the approach loop 66, an audio frequency signal will no longer be received by the pickup detector 26. The receiving unit 188 will therefore no longer activate the solenoid 202 and the governor arm 210 will not cause the governor 214 to idle the vehicle. In other words, the vehicle will be free to travel and can therefore move into the pit area 44.

The system and kit 182 of the instant invention have several advantages over the prior art. This system is very flexible allowing the use of radio and/or audio frequency signals to control a go kart. All go karts or individual go karts can selectively be controlled. For example, if an emergency situation arises, all go karts can within the operation area 42 can be idled so they drift to a stop. The emergency situation can then be dealt with. Alternatively, if a driver is rowdy or there is a panic driver, a single go kart can be selected if a means 178 is provided for selecting one go kart. This go kart can then be idled such that the problem can be dealt with.

Moreover, the instant system provides for the use of a single area loop 70 or approach loop 66 and pit loop 62. Thus, the system can be adapted to particular needs of an individual track.

By providing an approach loop 66, karts stopped short of the pit area 44 can be boosted into the pit area. Thus it is not necessary for an operator to go into the approach area and push a stopped kart into the pit. Efficiency of the system is therefore increased. However, if it is necessary to boost one kart from the approach loop area into the pit area 44, those karts which are within the pit area 44 cannot escape when two loops 66, 62 are used. Specifically, because only the approach loop is deactivated while the pit loop 60 remains activated, karts within the pit area 44 remain idle.

By providing a buried loop cable for the pit loop 60, approach loop 66, area loop 70 and general loop 72 (if used), certain advantages are obtained in the instant system. Damage to the cable is avoided and the travel of the karts will not be affected by this cable. Also, riders tripping over the wire when getting into or out of the go kart will be avoided.

The first means 150 of the instant invention also provides several unique benefits. As noted above, if an emergency situation arises, all karts or a selected kart in the operation area 42 can be stopped. Such emergency situations include a go kart wreck or single go kart malfunction as well as rowdy or panicky riders. Moreover, if a rider accidentally hits the accelerator 36 instead of the brake 35, this first means 150 can be actuated.

More importantly, if the rider entering the pit area accidentally hits the accelerator 36 instead of the brake 34, the approach loop 66 and pit loop 60 (or the single area loop 70) will prevent this rider from slamming into the other karts. Even if the rider purposely tries to speed into the pit area 44, the approach loop 66 and pit loop 62 will prevent this. Thus, chances of injury to customers and employees are reduced. Also, the karts are less likely to bump and push into one another. Wear and resultant damage to the karts is avoided and less maintenance is therefore required.

Since the instant system is automated, the degree to which employee monitor the track can be reduced. For example, the timer means will automatically activate the area loop after the ride cycle. Once activated, it is generally safe for the employees to walk in the pit area to help passengers load and unload. However, without the this automation, the pit and approach loops could accidentally remain deactivated. A go kart at full throttle could speed into the pit seriously injuring the employees or customers. However, with the automation provided by the timer means, this situation will not occur.

Because such positive control is exerted over the go karts in the instant system, liability premiums for insurance may sometimes be reduced. Therefore, not only are maintenance and associated costs reduced by the instant system but other incidental costs can also be reduced. For example, the instant system will ensure that riders do not exceed the ride cycle. In other words, because the approach loop 66 is automatically actuated by the timer means 142, a rider cannot try to sneak past the pit area 44 and obtain an extra lap.

Moreover, provision of the means for idling 216 in the kit 184 satisfies potential requirements by some states to have a cutoff switch in the go karts.

Also, the kit 184 of the instant invention has few moving parts. It is therefore less likely to wear or require maintenance.

Because the control of the track is well maintained by the instant system, the number of employees of the track can sometimes be reduced while maintaining adequate supervision over the operation area 42. This can result in a substantial savings to a track operator.

The instant system and kit therefore provides for a positive control arrangement for go karts on a track. Track safety and security are greatly enhanced while costs are reduced. Danger to operators and riders can be avoided. Damage to the karts themselves can be avoided such as when there is an accident on the track or a troublemaker and all karts or a selected kart is idled. Moreover, racing of the engine 16 when karts are in the pit area 44 can be avoided when the pit loop 62 is actuated. Karts entering this pit area 44 can be positively controlled to reduce the chance of injuries to customers and employees. Thus, the instant system and kit provide for a safe, automated track.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

We claim:

1. A system for controlling at least one go kart in an operation area, the at least one go kart having an engine and the operation area including a track and a pit area, the system comprising:
   a general transmitter for sending a general signal to the entire operation area;
   an area transmitter for sending an area signal to one portion of the operation area, the one portion being less than the entire area of the operation area;
   at least one receiver unit on each of the at least one go kart, the receiver unit receiving the general signal and the area signal;
   means on each of the at least one go kart operatively connected to the at least one receiver unit for idling the engine of the go kart when the at least one receiver receives one of the general signal and area signal, the means for idling being mounted on each of the at least one go kart; and
   control means for selectively activating and deactivating the general transmitter and the area transmitter, the control means being operatively connected to both the general transmitter and the area transmitter, the control means comprises a first control unit and a second control unit, the first control unit being generally located in the pit area, both the first and second control units having a first switch and a second switch, each of the first switches being operatively connected to first means for activating the general transmitter and each of the second switches being connected to second means for deactivating at least a portion of the area transmitter, the first control unit further having timer means for counting time and determining when a predetermined period of time has elapsed, the predetermined period of time corresponding to one ride cycle and the timer means issuing a signal to the area transmitter when the predetermined period has elapsed thereby idling the at least one go kart when the at least one go kart is in the one portion of the operation area.

2. The system as recited in claim 1, wherein the general transmitter idles the at least one go kart in the operation area upon actuation of the first means and wherein upon activation of the first means counting by the timer means is temporarily stopped, the second means further overrides the timer means to stop the area transmitter from sending the signal at least to a portion of the area transmitter to thereby stop idling of the at least one go kart in the one portion of the operation area.

3. The system as recited in claim 2, wherein the area transmitter is divided into an approach loop and a pit loop, the pit loop generally enclosing the pit area and the approach loop generally enclosing a portion of the track before the pit area, both the approach loop and the pit loop generally defining the one portion of the operation area, the second means only overrides the timer means for the approach loop such that upon actuation of both the timer means and the second means, the at least one go kart will be idled only in the area defined by the approach loop but when only the timer means is activated and the second means fails to be activated, the at least one go kart will be idled in both areas defined by the approach loop and the pit loop.

4. The system as recited in claim 3, wherein the first means overrides both the second means and the timer means to idle the at least one go kart in both the pit area and the track, the general transmitter which is activated by the first means being one of a radio signal transmitter and an audio frequency signal transmitter.

5. The system as recited in claim 4, wherein the general transmitter is a radio signal transmitter which broadcasts a radio signal to each of the at least one go kart in both the pit area and the track upon activation of the first means and the at least one receiver unit on each of the at least one go kart having an antenna and a loop pickup detector, the antenna receiving the radio signal from the general transmitter upon activation of the first means and the means for idling in response thereto idles the at least one go kart.

6. The system as recited in claim 4, wherein the general transmitter is a general loop which encircles the pit area and track, the general loop issues an audio frequency signal to each of the at least one go kart in both the pit area and the track upon activation of the first means, the at least one receiver unit on each of the at least one go kart being a loop pickup detector which receives the audio frequency signal from the general transmitter upon activation of the first means and the means for idling in response thereto idles the at least one go kart.

7. The system as recited in claim 2, wherein the area transmitter is defined by an area loop generally encircling the pit area and a section of the track before the pit area such that the area transmitter generally encloses the one portion of the operation area, whereby the timer means upon issuing the signal to the area transmitter idles the at least one go kart in the pit area and the section of the track before the pit area and whereby upon activation of the second means, the at least one go kart is free to travel through the pit area and the track regardless of whether the timer means issues a signal to the area transmitter, and wherein the first means overrides both the second means and timer means to idle the at least one go kart in both the pit area and the track.

8. The system as recited in claim 7, wherein the general transmitter is a radio signal transmitter which broadcasts a radio signal to each of the at least one go kart in both the pit area and the track upon activation of the first means and the at least one receiver unit on each of the at least one go kart having an antenna and a loop pickup detector, the antenna receiving the radio signal from the general transmitter upon activation of the first means and the means for idling in response thereto idles the at least one go kart.

9. The system as recited in claim 7, wherein the general transmitter is a general loop which encircles the pit area and track, the general loop issues an audio frequency signal to each of the at least one go kart in both the pit area and track upon activation of the first means, the at least one receiver unit on each of the at least one go kart being a loop pickup detector which receives the audio frequency signal from the general transmitter upon activation of the first means and the means for idling in response thereto idles the at least one go kart.

10. The system as recited in claim 2, wherein the first and second means are located within the first control unit.

11. The system as recited in claim 1, wherein the first control unit further includes a power switch for turning the first control unit on and off, a pit loop indicator for showing activation of the area transmitter and at least one switch operatively connected to the timer means for changing the predetermined period of time to thereby lengthen or shorten time for the one ride cycle.

12. The system as recited in claim 11, wherein the area transmitter is divided into an approach loop and a pit loop, the pit generally enclosing the pit area and the approach loop generally enclosing a portion of the track before the pit area, both the approach loop and pit loop generally defining the one portion of the operation area, the approach loop issuing an approach loop signal and the pit loop issuing a pit loop signal upon activation thereof, both the approach loop signal and pit loop signal being the area signal, and the first control unit further includes a pit loop frequency switch and an approach loop frequency switch, the pit loop frequency switch varying strength of the pit loop signal and the approach loop frequency switch varying strength of the approach loop signal.

13. The system as recited in claim 11, wherein the area transmitter is divided into an approach loop and a pit loop, the pit loop generally enclosing the pit area and the approach loop generally enclosing a portion of the track before the pit area, both the approach loop and pit loop generally defining the one portion of the operation area, the approach loop issuing an approach loop signal and the pit loop issuing a pit loop signal upon activation thereof, both the approach loop and pit loop signal being the area signal, and the first control unit further includes;

a pit loop control switch movable between on, normal and off positions, the pit loop failing to issue a pit loop signal when the pit loop control switch is in the off position, the pit loop constantly issuing a pit loop signal when the pit loop control switch is in the on position, and the pit loop issuing a pit loop signal when the pit loop control switch is in the normal position and when the timer means issues the signal indicating elapse of the predetermined period of time; and an approach loop control switch movable between on, normal and off positions, the approach loop failing to issue an approach loop signal when the approach loop control switch is in the off position, the approach loop constantly issuing an approach loop signal when the approach loop control switch is in the on position, and the approach loop issuing an approach loop signal when the approach loop control switch is in the normal position, when the timer means issues the signal indicating elapse of the predetermined period of time and when second means fails to be activated.

14. The system as recited in claim 1, wherein the at least one receiver unit comprises a loop pickup detector and a kart antenna and wherein the general transmitter is a radio signal transmitter and the area transmitter is an area loop encircling the one portion of the operation area, the radio signal transmitter issues a radio signal upon activation thereof and the area loop issues an audio frequency signal upon activation thereof, the means for idling on each of the at least one go kart idling the at least one go kart regardless of the location of the go kart in the pit area and track upon the kart antenna receiving the radio signal from the general transmitter and the means for idling further idling the at least one go kart only when the go kart is in the one portion of the operation area upon the loop pickup detector receiving the audio frequency signal from the area transmitter.

15. The system as recited in claim 1, wherein the at least one receiver unit comprises a loop pickup detector and wherein the general transmitter is a general loop encircling both the pit area and track and the area transmitter is one area loop encircling the one portion of the operation area, both the general loop and area loop issuing an audio frequency signal upon activation thereof, the means for idling on each of the at least one go kart idling the at least one go kart regardless of the location of the go kart in the pit area and track upon the loop pickup detector receiving the audio frequency signal from the general transmitter and the means for idling further idling the at least one go kart only when the go kart is in the one portion of the operation area upon the loop pickup detector receiving the audio frequency signal from the area transmitter.

16. The system as recited in claim 1, wherein the means for idling comprises a solenoid and governor arm, the solenoid being operatively connected to the at least one receiver unit and being energized upon the receiver unit receiving one of the general signal and the area signal, the governor arm being operatively connected between the solenoid and the engine of the go kart and being movable upon energization of the solenoid, the governor arm moving so as to idle the engine of the go kart.

17. The system as recited in claim 1, wherein a plurality of go karts are used and further comprising control means for selectively activating and deactivating the general transmitter and the area transmitter, all of the plurality of go karts being idled upon activation of the general transmitter regardless of the location of the go karts in the operation area and all of the go karts within the one portion of the operation area being idled upon activation of the area transmitter.

18. The system as recited in claim 1, wherein a plurality of go karts are used and further comprising control means for selectively activating and deactivating the general transmitter and the area transmitter, a selected one of the go karts being idled upon activation of the general transmitter regardless of the location of the selected go kart in the operation area and all of the go karts within the one portion of the operation area being idled upon activation of the area transmitter.

19. The system as recited in claim 1, wherein the first control unit is a generally stationary control unit and wherein the second control unit is a hand-held control unit.

20. A kit for a go kart having an engine, the engine being mounted on a frame of the go kart and the go kart being used in an operation area, the operation area including a track and a pit, the operation area further including one portion thereof which one portion is less than the entire area of the operation area, the kit comprising:
a receiver unit mountable on the go kart, the receiver unit including a kart antenna and a loop pickup detector, the antenna receiving a selectively transmitted general signal and the loop pickup detector receiving a selectively transmitted area signal;
a governor arm operatively connectable to the engine, the governor arm being movable between a first position and a second position, the governor arm in the first position causing the engine to idle and the governor arm in the second position being noninterfering with the engine; and
activation means for moving the governor arm between the first and second positions, the activation means being positionable between the receiver unit and the governor arm and being activated by the receiver unit upon receipt of at least one of the general signal and the area signal,
upon receipt of the general signal by the receiver unit, the activation means moves the governor arm to the first position regardless of the location of the go kart in the operation area and upon receipt of the area signal by the receiver unit, the activation means moves the governor arm to the first position when the go kart is located in the one portion of the operation area, otherwise the activation means positions the governor arm in the second position.

21. The kit as recited in claim 20, wherein the general signal is a radio signal which is received by the kart antenna and wherein the area signal is an audio frequency signal which is received by the loop pickup detector.

22. The kit as recited in claim 21, further comprising a loop pickup detector bracket, the loop pickup detector being mountable to the frame of the go kart with the loop pickup detector bracket.

23. The kit as recited in claim 20, wherein the receiver unit has the loop pickup detector and wherein the general signal and the area signal are both audio frequency signals received by the loop pickup detector.

24. The kit as recited in claim 20, further comprising a loop pickup detector bracket, the loop pickup detector being mountable to the frame of the go kart with the loop pickup detector bracket.

25. The kit as recited in claim 20, wherein the activation means comprises a solenoid having a reciprocable plunger and wherein the kit further comprises a governor link mounted to the plunger of the solenoid, one end of the governor arm being pivotally attached to the plunger and the other end of the governor arm being operatively attached to the engine.

26. The kit as recited in claim 20, wherein the engine of the go kart has a clutch an drive and wherein the kit further comprises a mounting bracket, the receiver unit and activation means being mountable on the bracket and the bracket being mountable to the engine of the go kart generally above the clutch and the belt drive.

27. The kit as recited in claim 20, wherein the engine of the go kart has a flywheel and wherein the kit further comprises a power source operatively connected to the receiver unit, the power source including a coil mountable adjacent the flywheel of the engine, the coil receiving energy from movement of the flywheel and the energy being used to power the kit when installed in the go kart.

28. The kit as recited in claim 20, further comprising battery operatively connected to the receiver unit, the battery supplying power to the kit when installed in the go kart.

29. A system for controlling at least one go kart in an operation area, the at least one go kart having an engine and the operation area including a track and pit area, the system comprising:
a general transmitter for sending a general signal to the entire operation area;
an area transmitter for sending an area signal to one portion of the operation area, the one portion being less than the entire area of the operation area;
at least one receiver unit on each of the at least one go kart, the receiver unit receiving the general signal and the area signal; and
means on each of the at least one go kart operatively connected to the at least one receiver unit for idling the engine of the go kart when the at least one receiver receives one of the general signal and area signal, the means for idling being mounted on each of the at least one go kart;
wherein the means for idling comprises a solenoid and governor arm, the solenoid being operatively connected to the at least one receiver unit and being energized upon the receiver unit receiving one of the general signal and the area signal, the governor arm being operatively connected between the solenoid and the engine of the go kart and being movable upon energization of the solenoid, the governor arm moving so as to idle the engine of the go kart, receipt of the general signal by the at least one receiver unit activating the means for idling and receipt of the area signal by the at least one receiver unit activating the means for idling.

* * * * *